E. W. KITCHEN.
POTATO PLANTER.
APPLICATION FILED OCT. 4, 1911.
1,034,017.
Patented July 30, 1912.
5 SHEETS—SHEET 1.
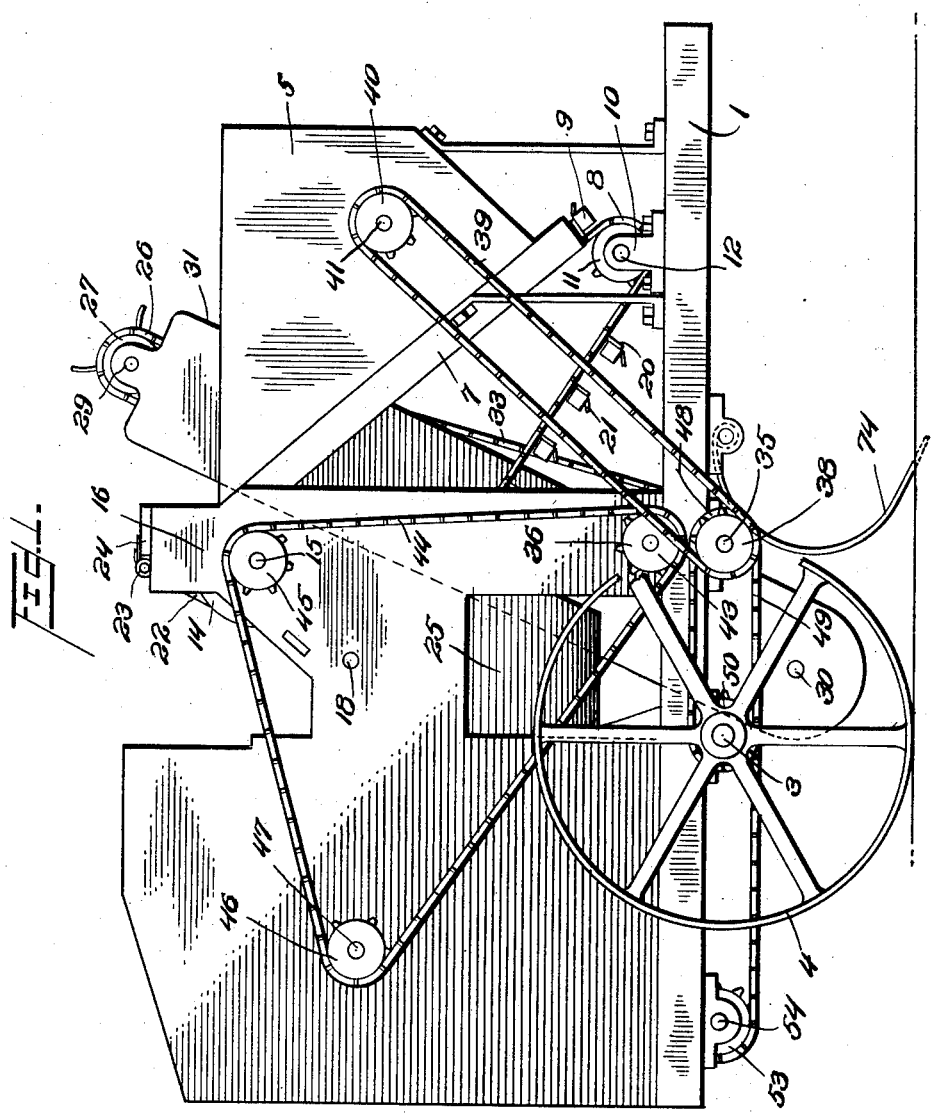
WITNESSES:
H. Strauss
R. H. Krenkel.
INVENTOR
Emanuel W. Kitchen
By Joshua R. H. Potts,
Attorney E. W. KITCHEN.
POTATO PLANTER.
APPLICATION FILED OCT. 4, 1911.
1,034,017.
Patented July 30, 1912.
5 SHEETS—SHEET 2.
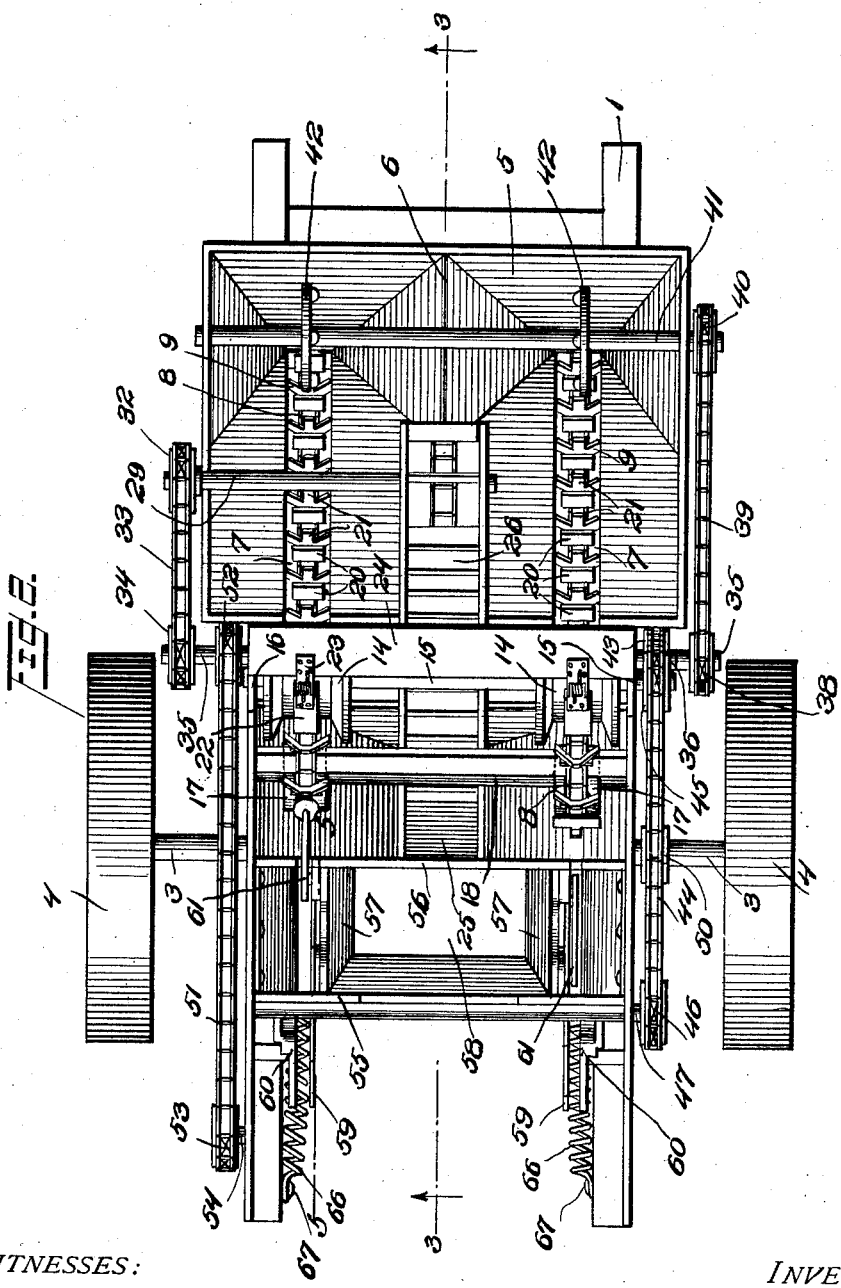

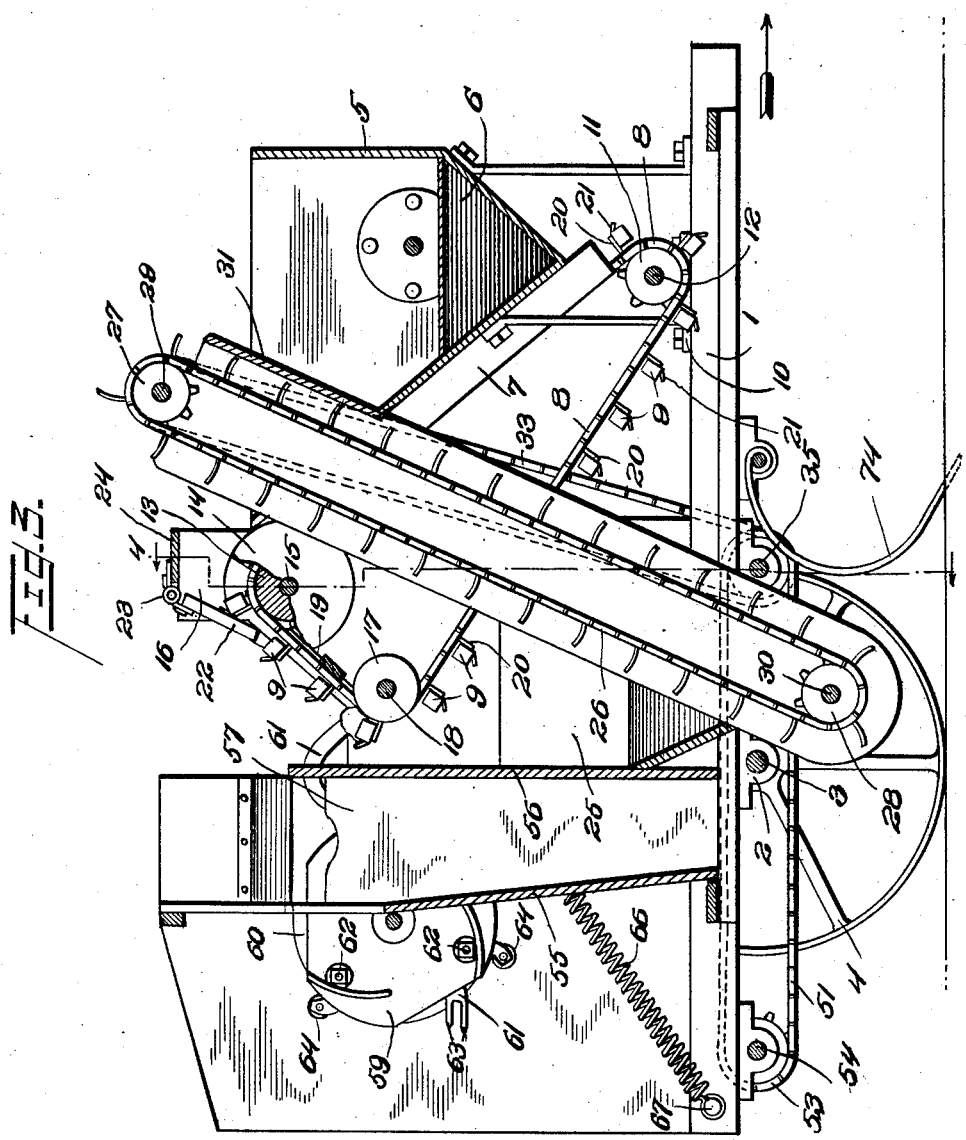

E. W. KITCHEN.
POTATO PLANTER.
APPLICATION FILED OCT. 4, 1911.
1,034,017.
Patented July 30, 1912.
5 SHEETS—SHEET 4.
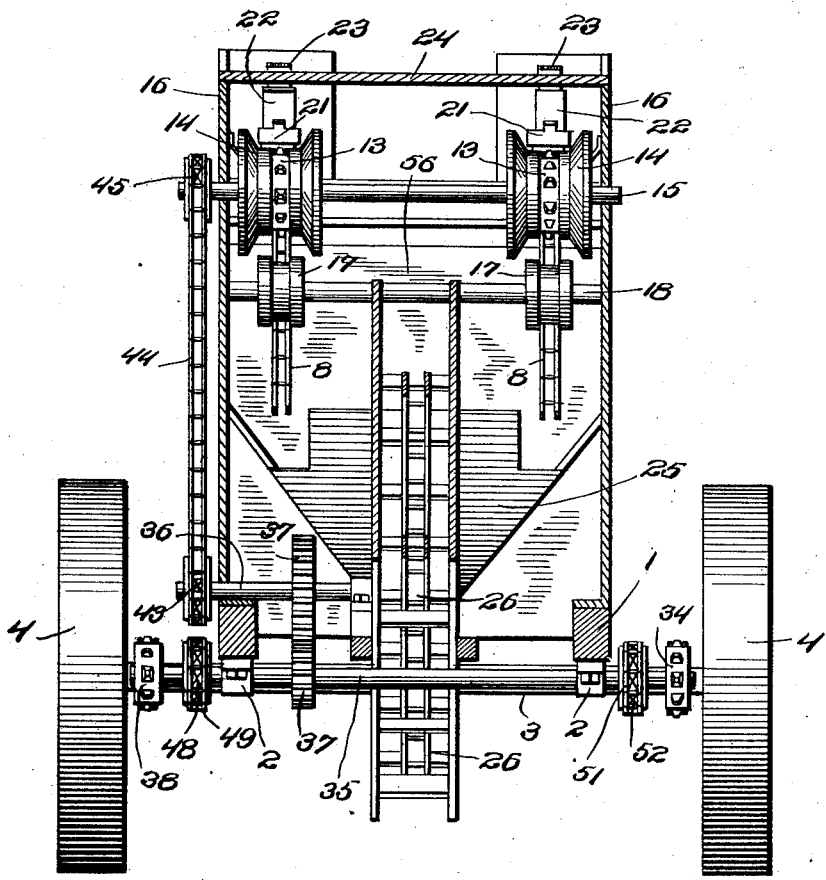
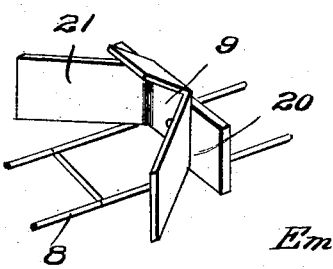
WITNESSES:
H. Strauss
R. H. Krenkel
INVENTOR
Emanuel W. Kitchen
By Joshua R. H. Potts
Attorney E. W. KITCHEN.
POTATO PLANTER.
APPLICATION FILED OCT. 4, 1911.
1,034,017.
Patented July 30, 1912.
5 SHEETS—SHEET 5.
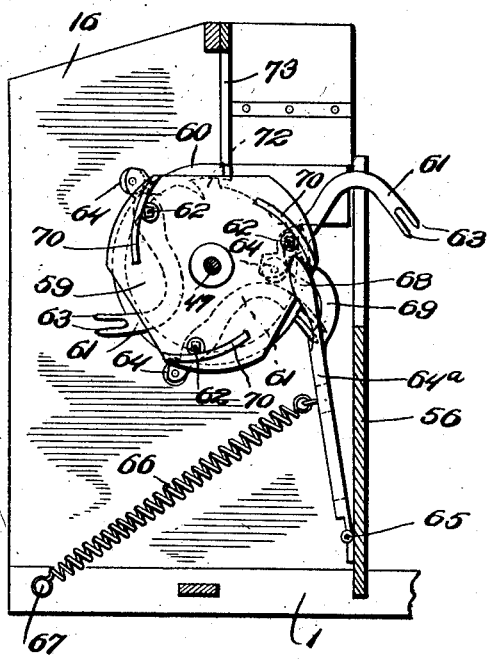
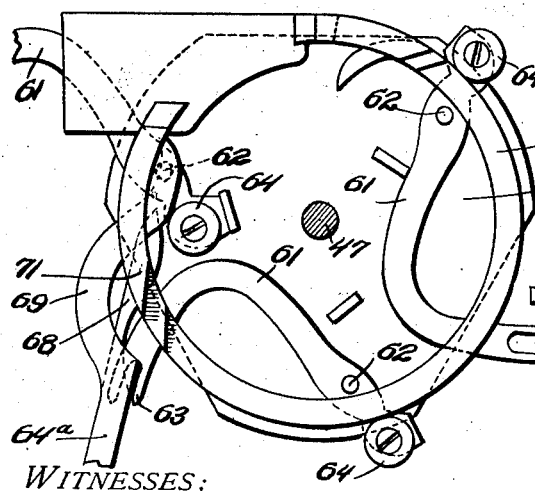
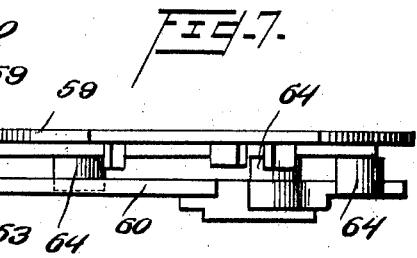
WITNESSES:
INVENTOR
Emanuel W. Kitchen
BY Joshua R. H. Potts
Attorney

UNITED STATES PATENT OFFICE.

EMANUEL W. KITCHEN, OF SOLEBURY, PENNSYLVANIA.

POTATO-PLANTER.

1,034,017.  Specification of Letters Patent.  Patented July 30, 1912.

Application filed October 4, 1911. Serial No. 652,824.

*To all whom it may concern:*

Be it known that I, EMANUEL W. KITCHEN, a citizen of the United States, residing at Solebury, in the county of Bucks and State of Pennsylvania, have invented certain new and useful Improvements in Potato-Planters, of which the following is a specification.

My invention relates to improvements in potato planters, an object of the invention being to provide a device of this character which is adapted to be drawn over the ground behind a plow and drop the potatoes directly into the furrow prepared for its reception.

A further object is to provide a planter of this character with improved means for conveying the potatoes from the hopper into position to be singly grasped by arms and dropped at regular intervals into the ground.

A further object is to provide a pair of dropping mechanisms operating alternately, and each provided with separate potato conveying means from a hopper to both of said mechanisms, and provide improved means for returning to said hopper the surplus potatoes carried by said potato conveying means.

A further object is to provide an improved arrangement of potato dropping arms with improved means for operating them.

A further object is to improve upon the construction set forth in my application for patent filed October 22, 1910, and given Serial No. 588,509, and patented Oct. 11, 1910, No. 1,005,435.

With these and other objects in view, the invention consists in certain novel features of construction and combinations and arrangements of parts, as will be more fully hereinafter described and pointed out in the claims.

In the accompanying drawings: Figure 1, is a view in side elevation illustrating my improvements. Fig. 2, is a top plan view. Fig. 3, is a view in longitudinal section on the line 3—3 of Fig. 2. Fig. 4, is a view in transverse section on the line 4—4 of Fig. 3. Fig. 5, is a view in longitudinal section through a portion of the planter on the line 5—5 of Fig. 2 showing in side elevation one of the potato dropping mechanisms. Fig. 6, is a view in elevation of the potato dropping mechanism taken from the opposite side to that shown in Fig. 5. Fig. 7, is an edge view looking down from the top upon the construction shown in Fig. 6, and Fig. 8, is a detail view of one of the conveyer buckets.

1, represents a horizontal frame which is provided with bearings 2 to receive an axle 3, and the latter is secured in the hubs of traction wheels 4. In any event, the wheels as they move over the ground, are adapted to turn the axle and may be fixed to the axle or otherwise connected.

On the forward end of the frame 1, a hopper 5 is supported, and is provided with a central inclined partition 6 forming the hopper into two compartments having inclined bottoms which communicate with inclined guides 7 through which chain conveyers 8 are adapted to move. These chain conveyers 8 comprise a plurality of connected sprocket links, having buckets 9 thereon as shown clearly in Fig. 8, and which will be more fully hereinafter described. These conveyers 8 pass over sprocket wheels 11 on transverse shafts 12, and the latter are mounted in bearings 10 on frame 1, adjacent the forward end of the latter, and below the hopper 5. The said conveyer chains also pass over sprocket wheels 13 which form parts of spool shaped guides 14 secured to a transverse shaft 15 mounted in the sides 16 near the center and upper part of the device. Said conveyer chains also engage idlers 17 which are mounted upon a shaft 18 located below and in rear of shaft 15. The chains therefore are positioned in a general triangular form, the shorter portion of the triangle being between the shafts 15 and 18, and this shorter portion is supported against inclined bases 19 so as to sustain the action of the dropping mechanism hereinafter described.

The buckets 9 above referred to comprise plates 20 which are rigidly secured to the links at right angles thereto, and serve to carry the potatoes up from the hopper as far as the sprocket wheel 13. On the back face of each of these plates 20, a receptacle 21 is formed preferably by bending a piece of sheet metal, so that it forms three tongues as clearly shown in Fig. 8. This constitutes a receptacle which serves to catch and hold the potato as it falls from the plate behind the same as the latter passes over the sprocket wheel 13. This also enables the surplus potatoes to fall to one side of the conveyer, because the pocket is approximately the size of a single potato to be planted.

To further facilitate the dropping of surplus potatoes, spring-pressed arms 22 have hinged connection 23 with a cross bar 24, and lie in the path of the buckets. As the buckets pass under these arms 22, the surplus potatoes will be knocked to one side. The arms also prevent the potatoes from being forced forward with a too great momentum, which might prevent them from dropping into the bucket below.

The potatoes which fall from the conveyers 9, drop into a compartment 25 which inclines to the center, and is provided at its center with an endless conveyer 26 which carries the surplus potatoes back into the hopper 5. This conveyer 26 is mounted upon sprocket wheels 27 and 28 respectively, and these sprocket wheels are secured upon shafts 29 and 30 respectively supported in the upper and lower portions of the device.

The hopper 5 is shaped at its front edge centrally to form a channel 31 through which the conveyer 26 moves, and over the top of this channel the potatoes are dropped into the hopper onto the central partition 6, and by the latter distributed into the compartments of the hopper.

The shaft 29 above referred to is provided on its outer end with a sprocket wheel 32 which is connected by a chain 33 with a sprocket wheel 34 on a shaft 35. This shaft 35 is supported on frame 1 adjacent the center of said frame, and below a short shaft 36. Short shaft 36 and shaft 35 are connected by gears 37, and on the end of shaft 35 opposite to the end on which sprocket wheel 34 is located, a second sprocket wheel 38 is secured. This sprocket wheel 38 is connected by a sprocket chain 39 with a sprocket wheel 40 on a shaft 41 extended through the hopper 5, and provided in said hopper with agitators 42 to prevent the potatoes packing in the hopper. On the outer end of short shaft 36, a sprocket wheel 43 is located, and a chain 44 connects this sprocket wheel 43 with a sprocket wheel 45 on shaft 15, and also with a sprocket wheel 46 on a shaft 47 extending through the sides of the planter at its upper rear portion, and this shaft 47 serves to drive my improved dropping mechanism which will be explained. Shaft 35 is also provided with a sprocket wheel 48 which is connected by a chain 49 with a sprocket wheel 50 on axle 3. A sprocket chain 51 connects a sprocket wheel 52 on shaft 35 with a sprocket wheel 53 on a shaft 54 located at the extreme rear of frame 1.

The sides of the planter at the rear are connected by transverse partitions 55 and 56, and these partitions are connected by longitudinal partitions 57 forming a central chute 58 down which the potatoes are dropped into the furrow.

On the shaft 47, at opposite sides of the chute 58, potato dropping mechanisms are provided, and as these mechanisms are precisely alike, the description of one will apply alike to both.

Each dropping mechanism consists of a disk 59, which is secured to turn with the shaft 47, and is located parallel with a circular track 60 secured against movement.

To each disk 59, a plurality of arms 61 are pivotally supported near their inner ends on bolts 62 mounted in disk 59. The particular number of these arms is not material, as I may use various numbers. I have shown three on each plate, but I may use more or less. The longer ends of these arms are hook shape and provided with teeth or prongs 63 to engage and hold the potato. The shorter ends of the arms are provided with rollers 64 which are adapted to run upon the track 60, and also adapted to be engaged by a lever 64ª which is pivotally connected at its lower end as shown at 65, and is connected between its ends by a coiled spring 66 with a fixed point 67 so as to exert a rearward spring pressure as shown. This lever 64 comprises two parallel members 68 and 69, the member 69 being positioned in line with the space between the disk 59 and the track 60 and the member 68 positioned against the opposite face of the disk and in the path of cams 70 on said disk.

It is to be understood that there will be a cam 70 for each arm 61, so that while the cams 70 serve to force the lever 64ª forwardly, the member 69 of lever 64ª, when the cams 70 pass member 68, will engage the roller 64 so as to swing the arm and force the prong 63 into a potato in one of the buckets 9 as clearly shown in Fig. 3. To permit this movement of the roller 64, track 60 is offset as shown at 71, so that the arm may swing on its pivot to sharply engage the potato. The track is also open as shown at 72, so that the roller may pass out again upon the track as the arm begins its rotary movement.

It is to be understood, of course, that the disk 59 is revolving so that when the arm 61 is forced forwardly to engage a potato, the arm immediately begins to move rearwardly through a slot 73 in partition 56. As this slot 73 is only large enough to accommodate the arm as soon as the potato engages the partition, it will be drawn over the prongs 63 and will be guided down through the chute 58 onto the ground.

It is my purpose to utilize my planter for dropping the potatoes directly into the furrow behind the plow, and to loosen the soil in the bottom of the furrow before the potato drops therein, I provide a spring cultivator tooth 74 which is connected to the frame 1 as clearly shown in Figs. 1 and 3.

The operation is as follows: The planter is drawn over the ground in the direction of the arrow in Fig. 3, and the traction wheels, through the medium of the several sprocket chains, sprocket wheels and shafts as above described, turn the several mechanisms to perform their functions. The conveyers 8 carry the potatoes up into position to be engaged by the arms 61 as shown in Fig. 3, and said arms drop the potatoes down the chute 58 into the furrow. The surplus potatoes which fall from the conveyers 9 are caught in the receptacle 25 and carried back into the hopper 5 by means of the conveyer 26. The dropping mechanisms at opposite sides of the apparatus operate alternately, so that a potato is dropped at regular predetermined intervals. This spaces the potatoes properly in the furrow, and insures a uniform planting.

The device is designed to be drawn by a draft animal and needs no appreciable guiding as it rides over the furrow with the tooth 74 in the furrow. The operator may therefore walk behind the machine, and if one of the arms should fail to drop the potato at the regular interval, he can drop one in by hand by simply throwing one through the chute 58. While I believe the efficiency of this machine would be very high, such an adaptibility renders it possible to insure a maximum of efficiency.

For convenience in claiming the apparatus, I shall use the term "casing" to include the sides and partitions to form the several chambers, compartments and receptacles of the device, and utilize this term to describe that portion of the device supported upon the frame other than the operating mechanism.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. In a potato planter, the combination with a frame, a casing supported on the frame, an axle supporting the frame, and traction wheels on the axle, of a hopper in the casing, a conveyer movable through the hopper, buckets on said conveyer adapted to carry the potatoes out of the hopper, a rotary device, a series of pivoted arms on said rotary device, and a spring-pressed lever constructed to engage said arms and move them to intermittently remove potatoes from the buckets of the conveyer, and drop them onto the ground, substantially as described.

2. In a potato planter, the combination with a frame, a casing supported on the frame, an axle supporting the frame, and traction wheels on the axle, of a hopper in the casing, a conveyer movable through the hopper, buckets on said conveyer adapted to carry the potatoes out of the hopper, a rotary device, a series of pivoted arms on said rotary device, a spring-pressed lever constructed to engage said arms and move them to intermittently remove potatoes from the buckets of the conveyer, and drop them onto the ground, said buckets comprising plates, and receptacles formed on the back of the plates and said conveyer so positioned as to drop the potatoes from the plates into the receptacles in advance thereof, substantially as described.

3. In a potato planter, the combination with a frame, a casing supported on the frame, an axle supporting the frame, and traction wheels on the axle, of a hopper in the casing, a conveyer movable through the hopper, buckets on said conveyer adapted to carry the potatoes out of the hopper, a rotary device, a series of pivoted arms on said rotary device, a spring-pressed lever constructed to engage said arms and move them to intermittently remove potatoes from the buckets of the conveyer, and drop them onto the ground, said buckets comprising plates, and receptacles formed on the back of the plates and said conveyer so positioned as to drop the potatoes from the plates into the receptacles in advance thereof, and spring-pressed arms over said conveyers and adapted to knock the surplus potatoes out of the receptacles, substantially as described.

4. In a potato planter, the combination with a frame, a casing supported on the frame, an axle supporting the frame, and traction wheels on the axle, of a hopper in the casing, a conveyer movable through the hopper, buckets on said conveyer adapted to carry the potatoes out of the hopper, a rotary device, a series of pivoted arms on said rotary device, a spring-pressed lever constructed to engage said arms and move them to intermittently remove potatoes from the buckets of the conveyer, and drop them onto the ground, spool shaped guides for said conveyers, and plates back of said conveyers at the point of engagement of said arms with the potatoes in the receptacle, substantially as described.

5. In a potato planter, the combination with a frame, a casing supported on the frame, an axle supporting the frame, and traction wheels on the axle, of a hopper in the casing, a conveyer movable through the hopper, buckets on said conveyer adapted to carrry the potatoes out of the hopper, a rotary device, a series of pivoted arms on said rotary device, a spring-pressed lever constructed to engage said arms and move them to intermittently remove potatoes from the buckets of the conveyer, and drop them onto the ground, a receptacle formed in said casing and into which the surplus potatoes from the conveyer fall, and a conveyer adapted to carry the potatoes from said receptacle back into the hopper, substantially as described.

6. In a potato planter, the combination with a frame, a casing supported on the frame, an axle supporting the frame, and traction wheels in the axle, of a hopper in the casing, a conveyer movable through the hopper, buckets on said conveyer adapted to carry the potatoes out of the hopper, a rotary device, a series of pivoted arms on said rotary device, a spring-pressed lever constructed to engage said arms and move them to intermittently remove potatoes from the buckets of the conveyer, and drop them onto the ground, said buckets comprising plates, and receptacles formed on the back of the plates and said conveyer so positioned as to drop the potatoes from the plates into the receptacles in advance thereof, a receptacle formed in said casing and into which the surplus potatoes from the conveyer fall, and a conveyer adapted to carry the potatoes from said receptacle back into the hopper, substantially as described.

7. In a potato planter, the combination with a frame, a casing supported on the frame, an axle supporting the frame, and traction wheels on the axle, of a hopper in the casing, a conveyer through the hopper, buckets on said conveyer adapted to carry the potatoes out of the hopper, a rotary device, a series of pivoted arms on said rotary device, a spring-pressed lever constructed to engage said arms and move them to intermittently remove potatoes from the buckets of the conveyer, and drop them onto the ground, said buckets comprising plates, and receptacles formed on the back of the plates and said conveyer so positioned as to drop the potatoes from the plates into the receptacles in advance thereof, spring-pressed arms over said conveyers and adapted to knock the surplus potatoes out of the receptacles, a receptacle formed in said casing and into which the surplus potatoes from the conveyer fall, and a conveyer adapted to carry the potatoes from said receptacle back into the hopper, substantially as described.

8. In a potato planter, the combination with a frame, a casing supported on the frame, an axle supporting the frame, and traction wheels on the axle, of a hopper in the casing, a conveyer movable through the hopper, buckets on said conveyer adapted to carry the potatoes out of the hopper, a rotary device, a series of pivoted arms on said rotary device, a spring pressed lever constructed to engage said arms and move them to intermittently remove potatoes from the buckets of the conveyer, and drop them onto the ground, spool shaped guides for said conveyers, and plates back of said conveyers at the point of engagement of said arms with the potatoes in the receptacle, a receptacle formed in said casing, and into which the surplus potatoes from the conveyer fall, and a conveyer adapted to carry the potatoes from said receptacle back into the hopper, substantially as described.

9. In a potato planter, the combination with a frame, a casing supported on the frame, and axles supporting the frame, of a double compartment hopper formed in the casing, independent conveyers for each compartment of the hopper, rotary devices, pivoted arms on said rotary devices, spring-pressed levers engaging said arms and adapted to move them so as to engage potatoes on the conveyer, and an outlet chute located between said rotary devices and through which the potatoes are dropped by said arms onto the ground, substantially as described.

10. In a potato planter, the combination with a frame, a casing supported on the frame, and axles supporting the frame, of a double compartment hopper formed in the casing, independent conveyers for each compartment of the hopper, rotary devices, pivoted arms on said rotary devices, spring-pressed levers engaging said arms and adapted to move them so as to engage potatoes on the conveyer, an outlet chute located between said rotary devices and through which the potatoes are dropped by said arms onto the ground, a compartment between the conveyers at the point of engagement of the arms with the potatoes and into which the surplus potatoes fall, and a conveyer constructed to carry the potatoes from said last-mentioned compartment back into the hopper, substantially as described.

11. In a potato planter, the combination with a frame, an axle supporting the frame, a hopper on the frame, and an endless potato conveyer constructed to carry potatoes out of the hopper, of potato dropping means comprising a shaft, means for turning the shaft, a disk on said shaft, an arm pivotally supported between its ends on said disk, one end of said arm constructed to engage a potato, a spring-pressed lever comprising two members, a cam on the disk engaging one member of the lever throughout a predetermined part of the revolution of said disk, and the other member adapted to engage the shorter end of said arm to throw the arm into position to engage a potato when the cam passes a first-mentioned member, substantially as described.

12. In a potato planter, the combination with a frame, an axle supporting the frame, a hopper on the frame, and an endless potato conveyer constructed to carry potatoes out of the hopper, of potato dropping means comprising a shaft, means for turning the shaft, a disk on said shaft, an arm pivotally supported between its ends on said disk, one end of said arm constructed to engage a potato, a spring-pressed lever comprising two members, a cam on the disk engaging one member of the lever throughout a predetermined part of the revolution of said disk, and the other member adapted to engage the shorter end of said arm to throw the arm into position to engage a potato when the cam passes a first-mentioned member, a roller on the shorter end of said arm adapted to be engaged by said lever, and a fixed track around which said roller rides, said track having offsets therein for the movement of the roller when the arm is forced into potato engaging position, substantially as described.

13. In a potato planter, the combination with a frame, an axle supporting the frame, wheels supporting the axle, a hopper supported on the frame, and an endless bucket conveyer constructed to carry potatoes out of said hopper, of potato dropping means comprising a shaft, means for turning the shaft, a disk fixed on said shaft, a plurality of arms pivotally supported between their ends on said disk, rollers on the shorter ends of said arms, prongs on the longer ends of said arms adapted to engage potatoes on the conveyer, rollers on the shorter ends of said arms, a fixed track against which said rollers run, a spring-pressed lever comprising two parallel members, cams on said disk adapted to engage one of said members to hold the lever outwardly, the other of said members adapted to move between the disk and the track when the cam has passed, whereby said last-mentioned member will engage the shorter end of the arms in regular order to throw them outward into potato engaging position, substantially as described.

14. In a potato planter, the combination with a frame, an axle supporting the frame, wheels supporting the axle, a hopper supported on the frame, and an endless bucket conveyer constructed to carry potatoes out of said hopper, of potato dropping means comprising a shaft, means for turning the shaft, a disk fixed on said shaft, a plurality of arms pivotally supported between their ends on said disk, rollers on the shorter ends of said arms, prongs on the longer ends of said arms adapted to engage potatoes on the conveyer, rollers on the shorter ends of said arms, a fixed track against which said rollers run, a spring-pressed lever comprising two parallel members, cams on said disk adapted to engage one of said members to hold the lever outwardly, the other of said members adapted to move between the disk and the track when the cam has passed, whereby said last-mentioned member will engage the shorter end of the arms in regular order to throw them outward into potato engaging position, a slotted partition through which said arms are moved, said slot smaller than the potatoes to be planted, and a chute in close proximity to said partition down which the potatoes are dropped onto the ground, substantially as described.

In testimony whereof I have signed my name to this specification in the presence of two subscribing witnesses.

EMANUEL W. KITCHEN.

Witnesses:
RICHD. C. FOULKE,
CHARLES GILBERT.

---

Copies of this patent may be obtained for five cents each, by addressing the "Commissioner of Patents, Washington, D. C."